United States Patent
Kozuka

(10) Patent No.: US 9,022,362 B2
(45) Date of Patent: May 5, 2015

(54) RESIDUAL MONOMER ELIMINATION DEVICE AND POLYVINYL ALCOHOL RESIN PRODUCTION METHOD

(75) Inventor: Takahiro Kozuka, Itoigawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 323 days.

(21) Appl. No.: 13/634,322

(22) PCT Filed: Dec. 6, 2010

(86) PCT No.: PCT/JP2010/071792
§ 371 (c)(1),
(2), (4) Date: Sep. 12, 2012

(87) PCT Pub. No.: WO2011/114585
PCT Pub. Date: Sep. 22, 2011

(65) Prior Publication Data
US 2013/0005906 A1    Jan. 3, 2013

(30) Foreign Application Priority Data

Mar. 18, 2010   (JP) ................................. 2010-062309

(51) Int. Cl.
| | | |
|---|---|---|
| *F02M 29/04* | (2006.01) | |
| *B01D 3/34* | (2006.01) | |
| *C08F 6/00* | (2006.01) | |
| *C08F 216/06* | (2006.01) | |
| *C08F 118/08* | (2006.01) | |
| *B01D 3/22* | (2006.01) | |

(52) U.S. Cl.
CPC ................ *B01D 3/343* (2013.01); *C08F 6/003* (2013.01); *C08F 216/06* (2013.01); *C08F 118/08* (2013.01); *B01D 3/22* (2013.01)

(58) Field of Classification Search
CPC ............. C08F 18/04; C08F 8/12; B01D 3/20; B01D 3/22; B01D 3/163
USPC .................................. 261/114.4, 114.5; 525/62
See application file for complete search history.

(56) References Cited

U.S. PATENT DOCUMENTS

| | | | |
|---|---|---|---|
| 3,463,464 A | | 8/1969 | Nutter et al. |
| 5,360,583 A | * | 11/1994 | Nutter .................. 261/114.3 |
| 5,468,425 A | * | 11/1995 | Nutter .................. 261/114.3 |
| 5,788,894 A | | 8/1998 | Yeoman et al. |
| 5,804,039 A | | 9/1998 | Kurazono et al. |
| 2007/0040289 A1 | * | 2/2007 | Pilling et al. .............. 261/114.4 |

FOREIGN PATENT DOCUMENTS

| | | |
|---|---|---|
| GB | 1449278 | 9/1976 |
| JP | S52-144242 | 4/1951 |
| JP | 51-47076 A | 4/1976 |
| JP | S52-144242 | 11/1977 |
| JP | 56-167707 A | 12/1981 |
| JP | 09-048815 A | 2/1997 |
| JP | 09-087320 A | 3/1997 |
| JP | 2001-233914 A | 8/2001 |
| JP | 2002-293823 A | 10/2002 |
| JP | 2007-245432 A | 9/2007 |

OTHER PUBLICATIONS

International Search Report of PCT/JP2010/071792 dated Mar. 1, 2011.
Office Action issued in the corresponding Chinese patent application 201080065559.2 dated Jul. 16, 2014.
Office Action issued in corresponding Japanese patent application 2012-505452 dated Sep. 16, 2014.

* cited by examiner

*Primary Examiner* — Robert Jones, Jr.
(74) *Attorney, Agent, or Firm* — Roberts Mlotkowski Safran & Cole P.C.

(57) ABSTRACT

Provided are an apparatus for removing residual monomers and a method of producing a polyvinyl alcohol resin that can prevent drift of the organic solvent gas and residual of the polymerization solution on the trays and permits efficient removal of the unreacted monomers from the polymerization solution. An apparatus 1 for removing residual monomers having a column main body and valve trays 2 having multiple gas blowout ports each having openings only in a direction perpendicular to the flow direction of the polymerization solution 4 or openings directed downward in the flow direction of the polymerization solution, which are installed in multiple stages in the column main body is used in a monomer-removing step of removing monomers in a polymerization solution 4 by bringing an organic solvent gas, such as methanol gas, into contact with a polymerization solution 4 obtained from a polymerization reactor 3.

7 Claims, 4 Drawing Sheets

(a)

(b)

(a)

(b)

RESIDUAL MONOMER ELIMINATION DEVICE AND POLYVINYL ALCOHOL RESIN PRODUCTION METHOD

TECHNICAL FIELD

The present invention relates to an apparatus for removing residual monomers and a method for producing a polyvinyl alcohol resin by using the apparatus. More specifically, it relates to a technique for removing unreacted monomers from a polymerization solution obtained in polymerization step.

BACKGROUND ART

Polyvinyl alcohol (PVA), a water-soluble synthetic resin, has been used mainly as a raw material for synthetic fibers. Recently, it is used in various fields, for example for production of film materials, emulsifying dispersants, adhesives and binder resins, because of its favorable properties. The PVA resins are generally produced by polymerization of a vinyl ester and saponification of the resulting polyvinyl ester in an organic solvent in the presence of a catalyst.

Normally in methods of producing a PVA resin, a monomer-removing step of removing unreacted monomers from the polymerization solution is carried out between polymerization and saponification steps. Examples of the method include feeding the polymerization solution obtained in polymerization step into a monomer-removing column having trays in multiple stages, and bringing methanol into contact with the polymerization solution, as methanol vapor is injected into the column from the column bottom (see Patent Documents 1 and 2).

On the other hand, perforated-plate columns having multiple compartment walls formed therein have been proposed as the monomer-removing column for use during production of polyvinyl chloride resins (see, for example, Patent Document 3). In the monomer-removing column described in Patent Document 3, a channel for treatment of the polymerization solution is formed with compartment walls, wherein the contact time between the polymerization solution and steam is regulated.

CITATION LIST

Patent Documents

[Patent Document 1] Japanese Unexamined Patent Application Publication No. 2002-293823
[Patent Document 2] Japanese Unexamined Patent Application Publication No. 2007-245432
[Patent Document 3] Japanese Unexamined Patent Application Publication No. 9-48815

SUMMARY OF INVENTION

Technical Problem

However, the conventional monomer-removing methods described above have the following problem. Bubble cap trays for distillation column have been used as the trays in conventional monomer-removing columns but, such trays had a problem of large flow resistance, which causes large difference in fluid depth over the tray, as the polymerization solution fed into the monomer-removing column is a high-viscosity fluid having a viscosity of more than 1 Pa·s. In addition, when there is difference in the depth of the polymerization solution over each tray (tray), it causes drift of gas and residual of polymerization solution, leading to deterioration in monomer removal efficiency.

Alternatively, the methods of forming a treatment channel by forming compartment walls on the trays, as in the monomer-removing column described in Patent Document 3, which is a structure easily giving residual liquid on the trays, have a problem of residual of the polymerization solution and blockage of the channel.

A major object of the present invention is to provide an apparatus for removing residual monomers and a method of producing a polyvinyl alcohol resin that can prevent drift of the organic solvent gas and residual of the polymerization solution over the trays, thus permitting efficient removal of the unreacted monomers from the polymerization solution.

Solution to Problem

The apparatus for removing residual monomers according to the present invention is an apparatus for removing residual monomers, at least including a column main body and valve trays having multiple gas blowout ports each having openings only in a direction perpendicular to a flow direction of a polymerization solution or openings directed downward in the flow direction of the polymerization solution, and the trays are installed in multiple stages in the column main body.

Because valve trays each having gas blowout ports having openings only in a particular direction are used in the present invention, drift of an organic solvent gas such as methanol and residual of the polymerization solution on the trays rarely occur. It is thus possible to improve processing efficiency and remove unreacted monomers in an amount equal to or larger than that by conventional methods by using an organic solvent gas in an amount smaller than that before.

Each of the gas blowout ports may be configured to have a through hole formed in a tray bottom face and an arch cover formed over the through hole, and in such a case, the tray is placed such that the lengthwise direction of the cover of the gas blowout port is identical with the flow direction of the polymerization solution.

Alternatively, each of the gas blowout ports may be configured to have the through hole formed in the tray bottom face and a cover formed over the through hole that has an opening only in one direction, and in such a case, the tray is placed such that each of the gas blowout ports has the openings directed downward in the flow direction of the polymerization solution.

The tray may have liquid-retaining walls formed upstream and downstream in the flow direction of the polymerization solution, and in such a case, at least the downstream-sided liquid-retaining wall is desirably installed, as it is tilted outward at an angle of 5 to 45°.

In addition, the apparatus can be used in a production process for polyvinyl alcohol.

The method of producing a polyvinyl alcohol resin according to the present invention is a method at least including a polymerization step of polymerizing one or more vinyl esters or copolymerizing a vinyl ester with other monomers copolymerizable therewith, a monomer-removing step of removing unreacted monomers by bringing an organic solvent gas into contact with the polymerization solution obtained in the polymerization step, and a saponification step of saponifying the unreacted monomer-free solution in a solvent containing the organic solvent in the presence of an alkali catalyst, and the unreacted monomers are removed from the polymerization solution in the monomer-removing step, by using an apparatus for removing residual monomers having a column main body and valve trays installed therein having multiple gas blowout ports each having openings only in a direction perpendicular to a flow direction of the polymerization solution or having openings directed downward in the flow direction of the polymerization solution.

In the present invention, because an apparatus for removing residual monomers, which has valve trays placed in multiple stages and each having gas blowout ports having openings only in a particular direction is used in the monomer-removing step, it is possible to raise processing efficiency, compared to conventional production processes.

For example, methanol can be used as the organic solvent in this production method.

Advantageous Effects of Invention

It is possible according to the present invention to prevent drift of the gas of organic solvent such as methanol and residual of the polymerization solution over trays and thus to remove the unreacted monomers efficiently from the polymerization solution, because valve trays having openings thereon in a particular direction are used.

BRIEF DESCRIPTION OF DRAWINGS

FIG. 3(a) shows a difference in liquid depth, while FIG. 3(b) shows pressure distribution.

FIG. 4(a) shows a difference in liquid depth, while FIG. 4(b) shows pressure distribution.

DESCRIPTION OF EMBODIMENTS

Hereinafter, favorable embodiments of the present invention will be described in detail with reference to attached drawings. It should be understood that the present invention is not restricted by the embodiments described below. In the method for producing a polyvinyl alcohol (PVA) in an embodiment of the present invention, an apparatus for removing residual monomers, having valve trays placed in multiple stages and each having an opening in a particular direction is used in the monomer-removing step for removing unreacted monomers from the polymerization solution (paste) obtained after polymerization step.

[Polymerization Step]

In the method of producing a PVA resin in the present embodiment, a polyvinyl ester is prepared by polymerization of one or more vinyl esters or by copolymerization of a vinyl ester with other monomers copolymerizable therewith. The vinyl esters for use include, for example, vinyl formate, vinyl acetate, vinyl propionate, vinyl valerate, vinyl caproate, vinyl laurate, vinyl stearate, vinyl benzoate, vinyl pivalate and vinyl versatate, but vinyl acetate is preferable from the viewpoint of polymerization stability.

Other monomers copolymerizable with these vinyl esters include, but are not particularly limited to, for example, α-olefins such as ethylene and propylene; alkyl (meth)acrylate esters such as methyl (meth)acrylate, ethyl (meth)acrylate, butyl (meth)acrylate and 2-ethylhexyl (meth)acrylate; unsaturated amides such as (meth)acrylamide and N-methylol acrylamide; unsaturated acids such as (meth)acrylic acid, crotonic acid, maleic acid, itaconic acid and fumaric acid; unsaturated acid alkyl (such as methyl, ethyl and propyl) esters; unsaturated acid anhydrides such as maleic anhydride; unsaturated acid salts (such as sodium salts, potassium salts, ammonium salts, and the like); glycidyl group-containing monomers such as allyl glycidylether and glycidyl (meth)acrylate; sulfonic acid group-containing monomer such as 2-acrylamido-2-methylpropanesulfonic acid and the salts thereof, phosphate group-containing monomers such as acid phosphoxyethyl methacrylate and acid phosphoxypropyl methacrylate; alkyl vinylethers and the like.

[Monomer-Removing Step]

Figure 1:
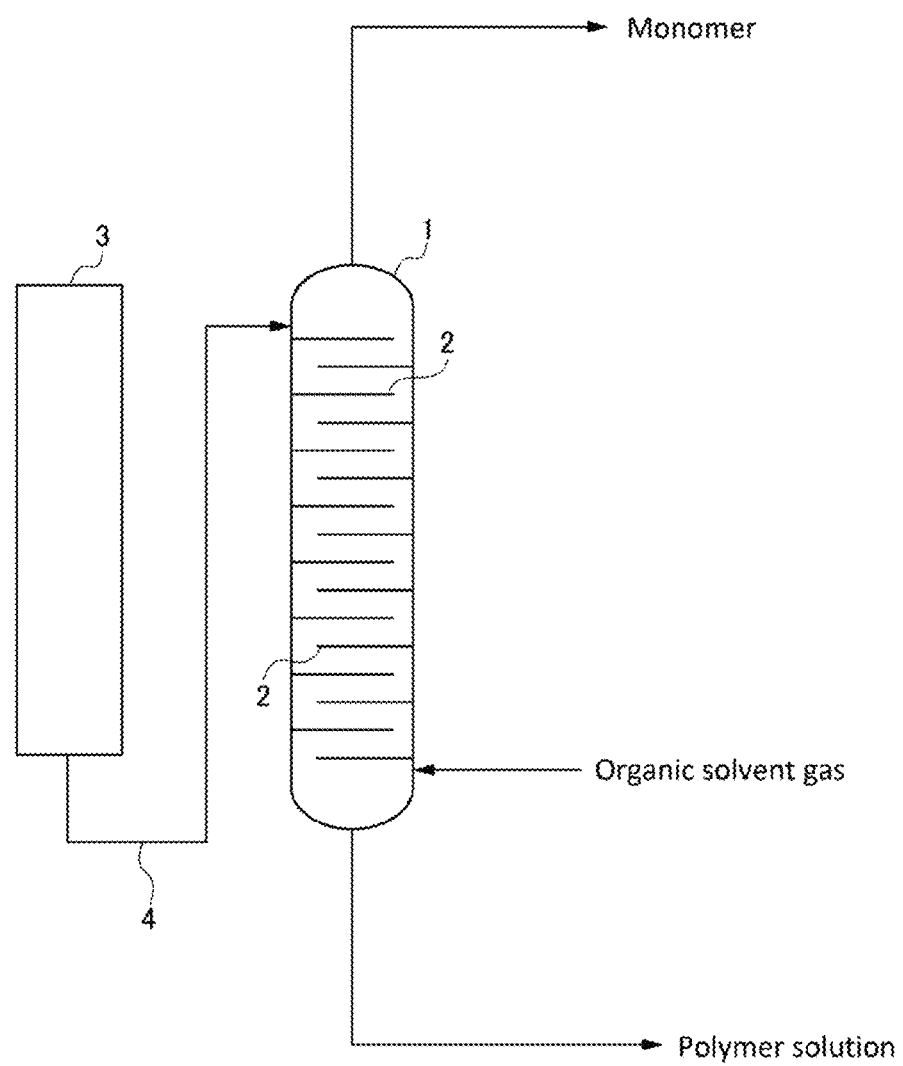
FIG. 1 is a schematic view illustrating the configuration of the apparatus for removing residual monomers for use in a method of producing a PVA resin according to an embodiment of the present invention.
Figure 2:
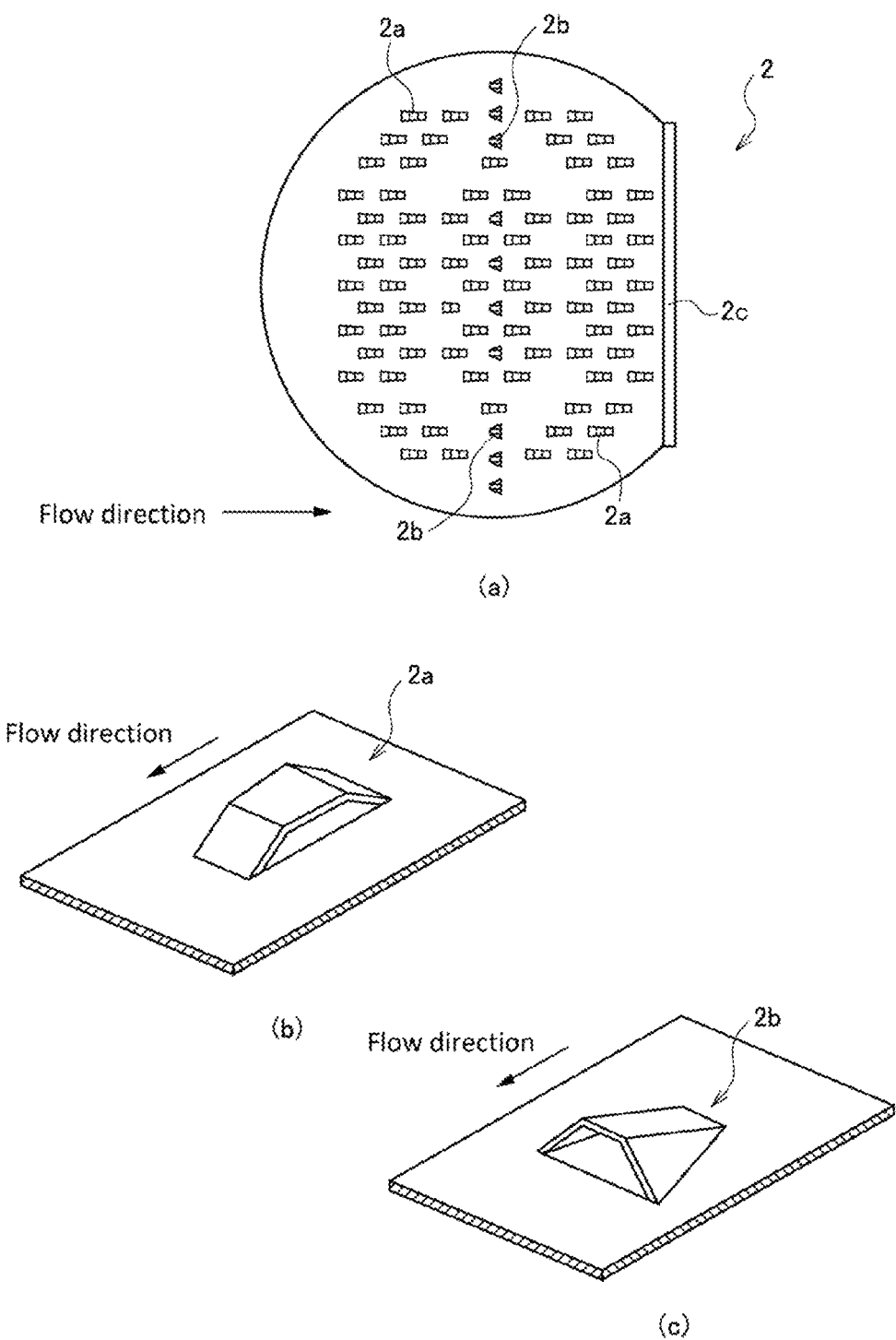
FIG. 2(a) is a top view of a tray 2 illustrating the configuration thereof in the apparatus 1 for removing residual monomers shown in FIG. 1.
FIG. 2(b) is a perspective view illustrating the shape of a gas blowout port 2a shown in FIG. 2(a)
FIG. 2(c) is a perspective view illustrating the shape of a gas blowout port 2b.

In the monomer-removing step, unreacted monomers (vinyl ester and other monomers) are removed from the polymerization solution obtained after the polymerization step described above. FIG. 1 is a schematic view illustrating the configuration of the apparatus for removing residual monomers for use then. FIG. 2(a) is a top view illustrating the tray 2 in the apparatus 1 for removing residual monomers shown in FIG. 1; FIG. 2(b) is a perspective view illustrating the shape of a gas blowout port 2a shown in FIG. 2 (a); and FIG. 2 (c) is a perspective view illustrating the shape of a gas blowout port 2b.

As shown in FIG. 1, the apparatus 1 for removing residual monomers used in the present embodiment has an approximately tube-shaped column main body and multiple valve trays 2 placed therein at a particular gap. The column main body also has a polymerization solution inlet port for introduction of the formed polymerization solution in the upper region and a gas inlet port for introduction of an organic solvent gas, i.e., a vaporized organic solvent such as methanol, in the lower region of the column main body. The column main body also has a degassing port for discharge of the organic solvent gas together with the monomer in the top region and an outlet port for discharge of the polymer solution after monomer removal in the bottom region.

As shown in FIGS. 2(a) and 2(b), each valve tray 2 installed in the column main body has multiple gas blowout ports 2a each having openings in the direction perpendicular to the flow direction of the polymerization solution, as formed in a matrix shape. The gas blowout ports 2a may be configured, for example, to have a through hole formed in the tray bottom face and an arch-shaped cover, as seen from the side, formed over the through hole. As shown in FIG. 2(b), it is possible to make the openings of each gas blowout port 2a face the direction perpendicular to the flow direction of the polymerization solution, by placing the valve tray 2 in such a manner that the lengthwise direction of the cover of the gas blowout port 2a is in parallel with the flow direction of the polymerization solution.

Also as shown in FIGS. 2(a) and 2(c), the valve tray 2 may have, in addition to the gas blowout ports 2a described above, gas blowout ports 2b having an opening directed downward in the flow direction of the polymerization solution. The gas blowout port 2b may be configured, for example, to have a through hole formed in the tray bottom face and a cover formed over the through hole that has an opening only in one direction and is closed in other three directions. The gas blowout port 2b can reduce the flow resistance of the polymerization solution, if the cover is formed in the shape ascending in the direction from the edge of the through hole to the opening.

The positions of the gas blowout ports 2b formed are not particularly limited, but, for example, these ports may be formed in the central region of the tray, as they are aligned in rows in the direction perpendicular to the flow direction of the polymerization solution 4 and separated from each other at a particular gap. The flow rate of the polymerization solution is generally smallest in the central region of the tray, but it is possible in such a configuration to make the flow rate of the polymerization solution more uniformized.

The shape of the through holes for gas blowout ports 2a and 2b is not particularly limited and may be in any shape, e.g., rectangular, trapezoidal, triangular, pentagonal, hexagonal, octagonal, circular or elliptic. The heights of the gas blowout ports 2a and 2b are also not particularly limited and can be set properly in accordance with the processing condition of the polymerization solution such as viscosity. However when the height of the gas blowout port 2a or 2b is more than 30 mm, it may result in increase of flow resistance and deterioration in processing efficiency. Thus, the heights of the gas blowout ports 2a and 2b are desirably 30 mm or less.

Alternatively, the opening areas of the gas blowout ports 2a and 2b can also be set arbitrarily in accordance with the processing condition, but the gas blowout port 2a or 2b having an opening area of less than 300 $mm^2$ may lead to insufficient amount of the organic solvent gas injected and thus to deterioration in processing efficiency. Therefore, the opening areas of the gas blowout ports 2a and 2b are desirably 300 $mm^2$ or more.

In addition, the open area ratio of the entire valve tray 2 is desirably 3 to 20%. It is thus possible to improve the efficiency of removing unreacted monomers drastically. An entire-valve-tray open area ratio of less than 3% may result in insufficient contact between the organic solvent gas and the polymerization solution, leading to increased residual of the unreacted monomers. Alternatively, an open area ratio of more than 20% may make it difficult to hold the polymerization solution at a particular depth on the valve tray 2.

The valve tray 2 has a liquid-retaining wall 2c formed downstream in the flow direction of the polymerization solution. The liquid-retaining wall 2c is formed for preservation of the polymerization fluid at a particular depth, and the height may be, for example, 20 to 100 mm. On the valve tray 2, the polymerization solution 4 overflows the liquid-retaining wall 2c into the lower valve tray 2. The liquid-retaining wall 2c on the valve tray 2 is desirably formed, as it is tilted outward at an angle of 5 to 45°. It is possible in this way to suppress residual of the polymerization solution at the bottom of the liquid-retaining wall.

The valve trays 2 described above are placed alternately, for example, such that polymerization-solution flow directions become opposite to each other. The number of the stages is not particularly limited, but it is desirably, for example, 10 to 50.

Hereinafter, a method of removing residual monomer from the polymerization solution 4 by using the apparatus 1 for removing residual monomers will be described. In the method for producing a PVA resin according to the present embodiment, a polymerization solution 4 is first fed from a polymerization reactor 3 to the top region of the apparatus 1 for removing residual monomers and thus conveyed on the valve trays 2. An organic solvent gas such as methanol is introduced from the lower region of the apparatus 1 for removing residual monomers, specifically from the position lower than the lowest stage of the valve tray 2 and injected through the gas blowout holes 2a and 2b in each valve tray 2 into the polymerization solution 4.

It results in contact between the polymerization solution 4 and the organic solvent gas, and the monomers in the polymerization solution 4 are discharged from the top of the column with the organic solvent gas. Alternatively, the monomer-free polymer solution is discharged form the bottom of the column and sent to the saponification step described below.

When methanol is used as the organic solvent gas, the temperature then is preferably 60 to 100° C. Alternatively, the concentration of the polymerization solution 4 is desirably 10 to 70 mass % and the viscosity thereof 0.001 to 2.0 Pa·s. It is possible in this way to remove monomers at high efficiency.

The kind of the organic solvent used in removal of the residual monomers from the polymerization solution 4 is not limited to methanol, as described above, and may be any solvent, if it is volatile. However because the organic solvent used then is the solvent in the saponification step described below, the organic solvent gas used for removal of residual monomers is desirably methanol.

[Saponification Step]

The monomer-removed polymer (polyvinyl ester) solution is then saponified in a solvent including the organic solvent described above in the presence of a catalyst. Alcohols such as methanol, ethanol, propanol, ethylene glycol, propylene glycol, glycerol and diethylene glycol can be used as the solvents for use, but methanol is particularly preferable.

Examples of the saponification catalysts include alkali catalysts such as sodium hydroxide, potassium hydroxide, sodium alcoholate and sodium carbonate and acid catalysts such as sulfuric acid, phosphoric acid and hydrochloric acid. Among the saponification catalysts above, use of an alkali catalyst is preferable and use of sodium hydroxide is more preferable. It is thus possible to raise saponification rate and improve productivity.

In the saponification step, part or all of the vinyl ester groups in the polyvinyl ester are saponificated to vinyl alcohol groups. The saponification degree of the PVA resin obtained in the saponification step described above is not particularly limited and may be determined arbitrarily, for example, in accordance with its application.

Also in the method of producing a PVA resin according to the present embodiment, a washing step for removal of impurities such as sodium acetate and a drying step may be carried out, as needed, after the polymerization and saponification steps above.

As described above in detail, in the method for producing a PVA resin according to the present embodiment, valve trays having gas blowout ports having openings in the direction perpendicular to the flow direction of the polymerization solution or opening directed downward in the flow direction are used in a shape lower in flow resistance, in the monomer-removing step. It is thus possible to make the depth of the polymerization solution uniformized, to make the flow resistance smaller than that by use of conventional trays, and to elongate the contact time between the organic solvent gas and the polymerization solution. It is thus possible to improve the processing efficiency and reduce the amount of the organic solvent gas used.

EXAMPLES

Hereinafter, the advantageous effects of the present invention will be described more specifically with reference to Examples and Comparative Examples of the present invention. In the Examples below, residual monomers were removed from a polymerization solution by using the valve trays (Example) or the bubble cap trays (Comparative Example) shown in the following Table 1 and the processing efficiencies were compared. The gaps between respective gas blowout ports in the bubble tray of Examples was 118.85 mm in the flow direction of the polymerization solution and 65.86 mm in the direction perpendicular to the flow direction of the polymerization solution. Alternatively, the diameter of the caps on the bubble cap tray of Comparative Example was 99 mm; the diameter of the gas blowout hole was 60 mm; and the gap between the tray bottom surface and the edge of the cap was 8 mm.

TABLE 1

|  | Example | Comparative Example |
|---|---|---|
| Number of stages (stages) | 30 | 30 |
| Tray gap (mm) | 450 | 450 |
| Height of downstream-sided liquid-retaining wall (mm) | 78.0 | 55.0 |
| Tilt of downstream-sided liquid-retaining wall (°) | 70 | 90 |
| Distance between bottom of liquid-retaining wall and bottom face of lower-stage tray (mm) | 53 | 20 |
| Number of valves or caps (number/tray) | 39 | 87 |
| Open area ratio (%) | 7.10 | 10.19 |
| Diameter of column main body (mm) | 1380 | 1380 |
| Height of column main body (mm) | 17250 | 17250 |

Unreacted vinyl acetate was removed from a polyvinyl acetate solution (polymerization solution) obtained by polymerization of vinyl acetate under the condition shown in the following Table 2. The results are summarized in the following Table 2. The "distilled amount" shown in the following Table 2 is the total amount of the unreacted monomers and methanol discharged from the top of the column. The "discharged amount" and "viscosity" of the polymer solution are respectively the amount and the viscosity of the polyvinyl acetate-methanol solution discharged from the bottom of the column after removal of the monomers.

TABLE 2

|  |  | Example | Comparative Example |
|---|---|---|---|
| Polymerization solution | Feed rate (kg/hour) | 6770 | 6520 |
|  | Viscosity (Pa · s) | 1.2 | 1.6 |
| Amount of methanol injected (kg/hour) |  | 3450 | 4000 |
| Distilled amount (kg/hour) |  | 4700 | 4840 |
| Polymer solution | Discharged amount (kg/hour) | 5520 | 5620 |
|  | Viscosity (Pa · s) | 2.12 | 2.12 |

As shown in Table 2 above, the amount of methanol injected could be reduced significantly in the apparatus for removing residual monomers of Example, where valve trays were used, compared to the conventional apparatus, where bubble cap trays were used.

Figure 3:
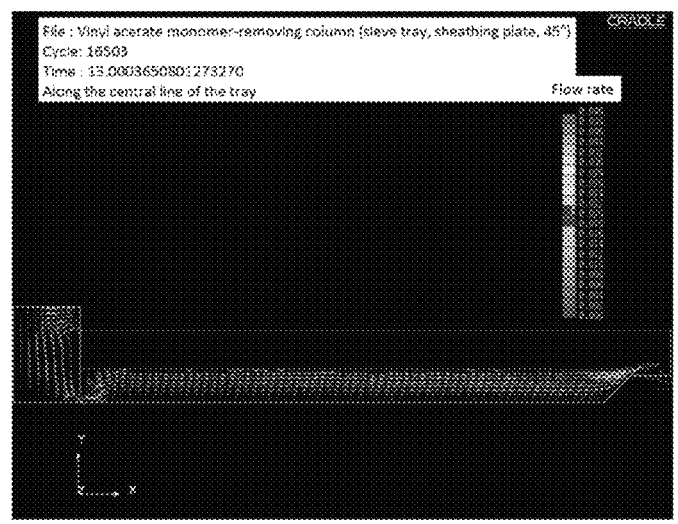
FIGS. 3(a) and 3(b) are charts showing the results of flow analysis of a polymerization solution when an apparatus for removing residual monomers of Example is used.
Figure 3:
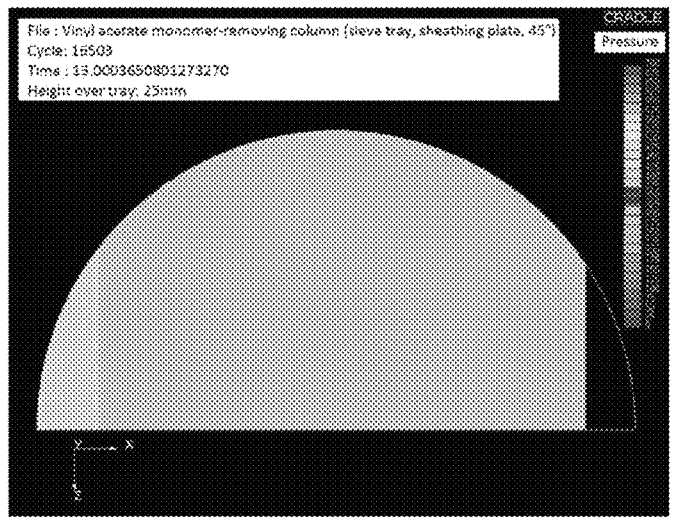
Figure 4:
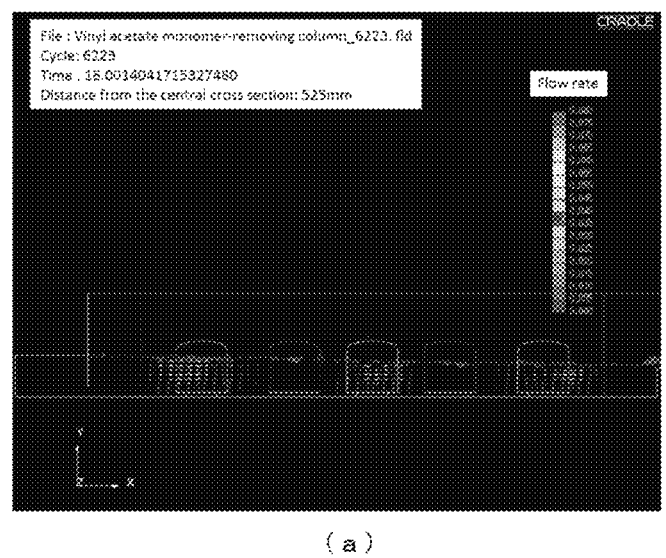
FIGS. 4(a) and 4(b) are charts showing the results of flow analysis of the polymerization solution when an apparatus for removing residual monomers of Comparative Example is used.
Figure 4:
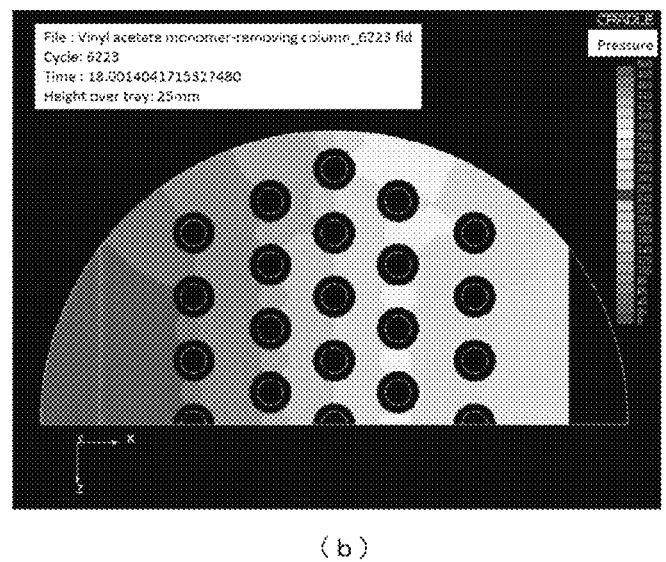

FIGS. 3(a) and 3(b) are charts showing the results of flow analysis of the polymerization solution when the apparatus for removing residual monomers of Example was used. FIG. 3(a) shows a difference in liquid depth, while FIG. 3(b) shows the pressure distribution. Alternatively, FIGS. 4(a) and 4(b) are charts showing the results of flow analysis of the polymerization solution when the apparatus for removing residual monomers of Comparative Example was used. FIG. 4(a) shows a difference in liquid depth, while FIG. 4(b) shows the pressure distribution. In the case of the Comparative Example, where the bubble cap trays shown in FIGS. 4(a) and 4(b) were used, there are difference in fluid depth and pressure distribution in the flow direction of the polymerization solution, while in the case of the Example shown in FIGS. 3(a) and 3(b), there was no difference in fluid depth and the pressure was uniform.

The results above show that it is possible by using the apparatus for removing residual monomers according to the present invention to prevent drift of the organic solvent gas or residual of the polymerization solution over trays and thus to remove the residual monomers efficiently.

REFERENCE SIGNS LIST

1: Apparatus for removing residual monomers
2: Tray
2a, 2b: Gas blowout port
2c: Liquid-retaining wall
3: Polymerization reactor
4: Polymerization solution

The invention claimed is:

1. An apparatus for removing residual monomers, at least comprising:
a column main body; and
valve trays having multiple gas blowout ports each having openings only in a direction perpendicular to a flow direction of a polymerization solution wherein
the trays are installed in multiple stages in the column main body,
the tray comprises liquid-retaining walls formed at an end of the tray downstream in the flow direction of the polymerization solution, and
the liquid-retaining wall is installed as tilted outward at an angle of 5 to 45° between a line perpendicular to the bottom face of the valve tray and the upper surface of the liquid-retaining wall.

2. The apparatus for removing residual monomers according to claim 1, wherein
the gas blowout ports are configured to have a through hole formed in a tray bottom face and an arch cover formed over the through hole, and
wherein the tray is placed such that the lengthwise direction of the cover of the gas blowout port is identical with the flow direction of the polymerization solution.

3. The apparatus for removing residual monomers according to claim 1, wherein the apparatus is used in a process for producing a polyvinyl alcohol.

4. A method for producing a polyvinyl alcohol resin, at least comprising:
a polymerization step of polymerizing one or more vinyl esters or copolymerizing a vinyl ester with other monomers copolymerizable therewith;
a monomer-removing step of removing unreacted monomers by bringing an organic solvent gas into contact with the polymerization solution obtained in the polymerization step; and
a saponification step of saponifying the unreacted monomer-free solution in a solvent containing the organic solvent in the presence of an alkali catalyst, wherein
the unreacted monomers are removed from the polymerization solution in the monomer-removing step, by using an apparatus for removing residual monomers having a column main body and valve trays installed therein having multiple gas blowout ports each having openings only in a direction perpendicular to a flow direction of the polymerization solution or openings directed downward in the flow direction of the polymerization solution.

5. The method for producing a polyvinyl alcohol resin according to claim 4, wherein methanol is used as the organic solvent.

6. The apparatus for removing residual monomers according to claim 1,
  wherein the trays further have multiple gas blowout ports having openings directed downstream in the flow direction of the polymerization solution.

7. The apparatus for removing residual monomers according to claim 6,
  wherein the gas blowout ports are configured to have the through hole formed in the tray bottom face and a cover formed over the through hole that has an opening only in one direction, and
  wherein the tray is placed such that each of the gas blowout ports has the openings directed downstream in the flow direction of the polymerization solution.

* * * * *